United States Patent [19]

Shimamura et al.

[11] 4,043,907

[45] * Aug. 23, 1977

[54] PROCESS FOR TREATING WASTE PHOTOGRAPHIC PROCESSING SOLUTIONS

[75] Inventors: Isao Shimamura; Haruhiko Iwano, both of Minami-ashigara, Japan

[73] Assignee: Fuji Photo Film Co., Ltd., Minami-ashigara, Japan

[ * ] Notice: The portion of the term of this patent subsequent to Mar. 4, 1992, has been disclaimed.

[21] Appl. No.: 505,877

[22] Filed: Sept. 13, 1974

Related U.S. Application Data

[63] Continuation-in-part of Ser. No. 307,265, Nov. 16, 1972, Pat. No. 3,869,383.

[30] Foreign Application Priority Data

| Nov. 17, 1971 | Japan | 46-92115 |
|---|---|---|
| Dec. 30, 1971 | Japan | 47-634 |
| Mar. 6, 1972 | Japan | 47-22907 |

[51] Int. Cl.$^2$ .............................................. B01D 15/06
[52] U.S. Cl. .................................... 210/32; 210/34; 210/37 B; 423/367
[58] Field of Search ............... 75/101 BE; 210/24, 30, 210/32, 34, 37; 423/367, 377

[56] References Cited

U.S. PATENT DOCUMENTS

| 3,001,868 | 9/1961 | Aueston et al. | 75/101 BE |
|---|---|---|---|
| 3,788,983 | 1/1974 | Fries | 210/37 |
| 3,869,383 | 3/1975 | Shimamura et al. | 210/32 |

FOREIGN PATENT DOCUMENTS 2,256,601  5/1973  Germany

*Primary Examiner*—Thomas G. Wyse
*Assistant Examiner*—Ivars Cintins
*Attorney, Agent, or Firm*—Sughrue, Rothwell, Mion, Zinn and Macpeak

[57] ABSTRACT

Ferricyanide and/or ferrocyanide ions are effectively removed from waste photographic treating solutions by contacting the solutions with weakly basic anion exchange resins. Improved results are obtained with the salt form of the weakly basic anion exchange resin when contacting takes place in the presence of a compound having a buffering action at a pH of 5 to 9, e.g., in the presence of boric acid, metaboric acid or a water soluble borate. Upon regeneration of the anion exchange resin the eluted ions can be reused as a photographic processing solution, e.g., a bleaching solution, with the addition of make up components.

20 Claims, No Drawings

PROCESS FOR TREATING WASTE PHOTOGRAPHIC PROCESSING SOLUTIONS

CROSS-REFERENCE TO RELATED APPLICATION

This application is a continuation-in-part application of Ser. No. 307,265 filed Nov. 16, 1972, now U.S. Pat. No. 3,869,383 for Isao Shimamura et al., entitled "Process for Treating Waste Photographic Processing Solutions".

BACKGROUND OF THE INVENTION

1. Field of the Invention

The present invention relates to a process for treating and regenerating waste solutions from photographic treatments. Particularly, the present invention relates to a process for treating waste solutions containing ferricyanide and/or ferrocyanide ions from photographic treatments.

2. Description of the Prior Art

In some cases, a bleaching step is included in treatments for photographic materials. Bleaching is a treatment whereby materials such as silver formed by development are returned to ionic form using an oxidizing agent, and is included in treatments for silver halide color photosensitive materials and silver dye bleaching photosensitive materials and reduction treatments for photographic materials used for printing.

In general, ferricyanides such as potassium ferricyanide are used as the oxidizing agent in bleaching solutions. In some cases, potassium bichromate, iron chelates, quinones and copper salts are used as the oxidizing agent instead of the ferricyanides. However, the ferricyanides are the most preferred bleaching agents from the view point of oxidizing power, ease of bleaching and their stability. However, faults encountered in using bleaching solutions containing ferricyanides are that the deteriorated bleaching solution must be replaced and ferricyanide ions discharged by overflowing during the treatment or by rinsing after bleaching, and ferrocyanide ions resulting from reduced ferricyanide ions, produce cyano compounds by photochemical oxidation (see "Behavior of Cyano Compounds in Water Ponds" Gidrokhim. Materialy 37, 133 – 43 (1964) written by Yu. Yu. Lur'c and V. A. Panova, and "Toxicity of Ferro- and Ferricyanide Solutions to Fish and Determination of the Cause of Mortality" Trans. Am. Fish Soc. 78, 192 (1948) written by George Edgar and Morris Lipschuetz).

Such cyano compounds have a strong toxicity and if introduced into the environment exhibit a very harmful pollutant effect.

In the past, quite often waste solutions containing ferricyanide and/or ferrocyanide ions have been discharged without any treatment.

To attempt to obviate the pollutant effects of cyano compounds on the environment, it has been suggested to reuse overflow bleaching solutions and deteriorated bleaching solutions which contain ferricyanide and/or ferrocyanide ions by regenerating such solutions. In order to reuse a bleaching solution by regenerating, it has been suggested to use persulfates (U.S. Pat. No. 2,944,895), ozone (French Pat. No. 2,015,461), iodine (British Pat. No. 1,229,077) and peracetic acid (French Pat. No. 2,005,207), etc.

However, even if regeneration is carried out using such processes, the ferricyanide ions and/or ferrocyanide ions are still carried in a washing bath, which is followed by a rinsing. Since the amount of the ferricyanide ions and/or ferrocyanide ions in the rinsing water is very small, the above mentioned process for regenerating cannot economically be utilized at all. Since the cyano compounds formed from the ferricyanide and ferrocyanide ions by photochemical decomposition have a very strong toxicity, it is necessary to remove the cyano compounds even though they are present in a small amount in the rinsing water. Ferricyanide and ferrocyanide ions at such low concentrations can nonetheless be removed by the formation of precipitates by reacting them with iron salts, by electrodialysis, by reverse osmosis or by a combustion or pyrolysis method, etc.

The formation of precipitates by reaction with iron salts utilizes the reaction between ferricyanide and ferrocyanide ions and iron ions to form Prussian blue. However, this method has the fault that it requires a long time for the sedimentation and large sedimentation apparatus because the particles of Prussian blue formed are very fine. Particularly in the case of a low ion concentration and a large quantity of water, such as with rinsing water, the precipitation method is difficult to carry out, and requires a large scale equipment.

Though the electrodialysis method and the reverse osmosis method are effective for treating solutions of a low concentration such as rinsing or washing water, they have the fault that the necessary equipment is expensive. This fault is especially encountered in treating solutions having a large quantity of water such as rinsing water, i.e., the cost of the equipment becomes very high because large apparatus is required. Further, the cost of operation is high because of the large amounts of electricity consumed.

The combustion method comprises evaporating and decomposing the waste solution at a high temperature by means of a heavy oil burner or the like. A similar method involves pyrolyzing wherein chemicals such as sodium hypochlorite are added to the waste solution followed by decomposition at high temperature. In the case of applying these methods to waste solutions from photographic treatments containing ferricyanide and/or ferrocyanide ions, very large heat sources are necessary because of the large quantity of water involved. Further, the ferricyanide ions will damage a combustion furnace because of their high oxidation ability, both a serious fault of the combustion or pyrolysis method.

On the other hand, with methods other than the combustion or pyrolysis method, the treatment of waste liquor results in a sedimentary residue or liquid waste. These products must be treated to make them harmless, but this is very difficult. If the ferricyanide and/or ferrocyanide ions contained in a photographic waste liquor could be recovered and reused as, e.g., a bleaching solution, this would be the best solution to this problem because ferricyanide and/or ferrocyanide ions would not be discharged at all.

SUMMARY OF THE INVENTION

Accordingly, one object of the present invention is to provide an economical process for effectively removing ferricyanide and/or ferrocyanide ions included in waste solutions resulting from photographic treatments.

Another object of this invention is to provide a process for recovering ferricyanide and/or ferrocyanide ions contained in waste solutions from photographic treatments and re-using such ions in, e.g, a bleaching solution.

As a result of many studies, the inventors have found that weakly basic ion-exchange resins are extremely effective for removing ferricyanide and/or ferrocyanide ions from such waste solutions, and further that in processing such waste solutions (which have been used for photographic processing) with the use of a weakly basic anion-exchange resin, the presence of borate ion markedly increases the ion-exchanging capability of such resins toward ferricyanide and/or ferrocyanide ions, and that a resin exchanged with ferricyanide and/or ferrocyanide ions can be easily regenerated with an aqueous alkali solution, e.g., an aqueous sodium hydroxide solution, and that the reduction in the ion-exchanging capability of the regenerated resin is extremely small.

The inventors have further discovered that ferrocyanide and/or ferricyanide ions may be effectively removed from solutions with greatly increased efficiencies using the free base from of a weakly basic anion exchange resin in the presence of a compound having a buffering action at a pH of from 7 to 9 when the free base from of the weakly basic anion exchange resin is used and having a buffering action of 5 to 9 when the salf form of the weakly basic anion exchange resin is used.

DETAILED DESCRIPTION OF THE INVENTION

Recently, processes for treating industrial waste solutions have been performed using ion-exchange resins to render the waste solutions harmless. For example, there have been treatments of radioactive wastes in the atomic energy industry and treatments of waste solutions containing heavy metals in the plating industry. It has not been known, however, to utilize ion-exchange resins for removing ferricyanide and/or ferrocyanide ions in waste solutions from photographic treatments. Furthermore, there is no description regarding the ion-exchange ability of ferricyanide ions in the literature which describes ionexchange resins. A reason why the ion-exchange capability of ferricyanide ions with ion-exchange resins has not been studied heretofore is because ion-exchange resins are considered to be very unstable to oxidation. In order to remove the ferricyanide ions, anion exchange resins are used which are more easily oxidized than cation exchange resins. Complex ions such as ferricyanide ions and ferrocyanide ions are difficult to desorb from ion-exchange resins when they are adsorbed in the ionexchange resins because of their having a large ion-exchange ability.

In general, available ion-exchange resins are roughly classified into the following four basic types.

| | | |
|---|---|---|
| (1) | Strongly acid cation-exchange resin | Free acid type |
| | | Salt type |
| | (exchange group: $-SO_3M$, $-CH_2SO_3M$) | |
| (2) | Weakly acid cation-exchange resins | Free acid type |
| | | Salt type |
| | (exchange group: $-COOM$) | |
| (3) | Strongly basic anion-exchange resins | Free base type |
| | | Salt type |
| | (exchange group: $\equiv N^+X^-$) | |
| (4) | Weakly basic anion-exchange resins | Free base type |
| | | Salt type |

-continued (exchange group: $-NH_2$, $=NH$, $\equiv N$)

M in the above exchange groups represents a cation and X represents an anion.

As a result of attempting the ion-exchange of ferricyanide ions and the ferrocyanide ions using anion exchange resins, the inventors found that weakly basic anion-exchange resins are very effective to accomplish such purpose.

Among the anion-exchange resins, strongly basic anion exchange resins are commonly used. However, the inventors found that ferricyanide ions and ferrocyanide ions are adsorbed strongly in the ion-exchange resins if ion-exchange of ferricyanide ions or ferrocyanide ions is carried out using strongly basic anion exchange resins (which contain the ammonium group), and consequently it is difficult to regenerate the anion exchange resin even be treating it with hydrochloric acid, sodium chloride or alkali hydroxide, or else if regeneration is possible, the ion-exchange ability of the regenerated ion exchange resins deteriorates greatly to only 10 to 40 wt% of the ion-exchange ability of the fresh resin. On the other hand, in examining the behavior of strongly basic anion-exchange resins in the presence of borate ion, the ease of regeneration of the ion-exchange resin is not substantially improved, though the ion-exchange capability toward ferricyanide and/or ferrocyanide ions does increases a little, and again the ion-exchanging capability of the regenerated resin reaches 10 – 40% that of the fresh resin. Furthermore, even when the strongly basic anion-exchange resin was used in the presence of strong acids such as sulfuric acid or hydrochloric acid, or organic acids such as acetic acid or citric acid, the ion-exchanging capability of the strongly basic anion exchange resin to ferricyanide and/or ferrocyanide ions could not be substantially improved.

The inventors found, however, that when weakly basic anion exchange resins, which are not commonly used as compared to the strongly basic anion exchange resins, are used for the purposes of this invention, unexpectdly they are very effective in accomplishing the removal of ferricyanide ions and ferrocyanide ions, and ferricyanide ions and ferrocyanide ions adsorbed in the weakly basic anion exchange resins are easily separated by regeneration of the weakly basic anion exchange resin with aqueous solutions of of acids, alkalis or salts such as sodium hydroxide, potassium hydroxide, sodium carbonate, potassium carbonate or aqueous ammonia solutions. In fact, the lowering of the ionexchange ability of the weakly basic anion-exchange resins after regeneration is very small, usually less than 10 wt%.

Since ion-exchange resins have the advantage that they can be reused by regenerating but are expensive, it is impossible in the economic sense to throw them away after use. Thus, it becomes possible for the first time to remove ferricyanide and/or ferrocyanide ions included in waste solutions from photographic treatments by using weakly basic anion exchange resins.

The weakly basic anion-exchange resins used in the present invention are preferably sytrene-divinylbenzene copolymers, methacrylate-divinylbenzene copolymers and phenolformaldehyde polycondensates having primary, secondary or tertiary amino groups as the ion-exchange group. Any weakly basic anion exchange resin can be used irrespective of the type of base part of the resins, the process of preparation, the degree of polymerization, structural shape or the method of preparation thereof, so long as it has at least a primary, secondary or tertiary amino group.

Typical available weakly basic anion exchange resins are Diaion WA-10, WA-11, WA-20, WA-21 and WA-30 (produced by Mitsubishi Chemical Ind. Ltd.) Amberlite IRA-45, IRA-93, IR-4B and IRP-58 (produced by Organo Co.) and DOWEX-44 (produced by Dow Chemical Co.). These materials are, of course, merely illustrative. In the following, the structural formulae of some of these materials are shown. Diaion WA-10

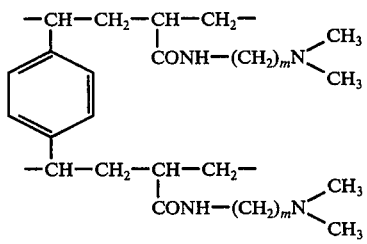

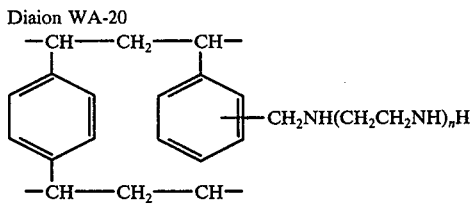

Diaion WA-20

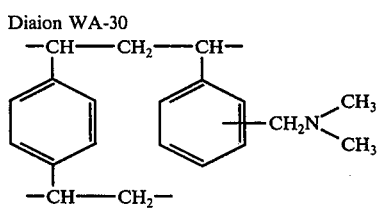

Diaion WA-30

In the above formulae m and n each represent an integer.

Among the weakly basic anion exchange resins used in the process of the present invention, resins which are more easy to regenerate are those having tertiary amino groups as the exchange group. Among these resins, the most preferred is Diaion WA-10. WA-10 has the highest adsorption per unit volume of resin for ferricyanide and ferrocyanide ions and can be regenerated most easily. WA-11 is a second preferred choice. In these resins, the amount of ferricyanide and ferrocyanide ions adsorbed based on the volume of the resins is largest, and the resins are most easy to regenerate.

Among the weakly basic anion exchange resins, there are free base type resins and salt type resins, and both types can be used in the process of the present invention. The salt type resins, in situ, can adsorb ferricyanide and ferrocyanide ions, but must be treated with an alkali and then an acid for the regeneration of the resins. The acid treatment is conducted to convert the resins to the salt type. On the other hand, while the free base type resins have, in situ, a lower ion exchange capability to ferricyanide and ferrocyanide ions they have the same capability when they are used in the presence of a material having a buffering capacity at a pH of from 7 to 9. The free base type resins need not be treated with an acid followed by an alkali treatment to regenerate them as with the salt type resins and they are commercially available, so they are generally used. The resins of the present invention are not, however, limited to the free base type resins.

As a compound having a buffering capacity at a pH of from 7 to 9 which greatly increases the usefulness of the free base form of the weakly basic anionic ion exchange resins used in the present invention, any compound may be used. As noted above, the pH can be extended to 5 to 9 when the salt type resin is used. However, in the photographic field, the materials used are generally acids or acid salts. Examples of such materials are inorganic and organic acids and the salts thereof, such as phosphoric acid, water soluble phosphates, bicarbonates, organic carboxylic acids and salts thereof such as citric, tartaric, phthalic and acetic acid. Organic polycarboxylic acids and the salts thereof are preferred. Preferred salts are the alkali metal and ammonium salts, e.g., sodium and potassium salts. However, a most preferred class of materials for accomplishing such purpose, which class is exemplified in great detail at a latter point of this specification, comprises boric acid, metaboric acid and various borates such as sodium borate, potassium bortate, ammonium borate, sodium metaborate and like wter soluble borates.

Usually the amount of buffering compound present ranges from about 1/10 to about $10^5$ molar times the sum of the moles of ferricyanide and ferrocyanide ions present. As will be explained later in greater detail, the buffering compounds can be added to the solution which is treated so that the buffering compound is present during contact with the free base form of the weakly basic anion exchange resin.

Alakli materials are usually used to regenerte the resins exchanged by ferricyanide and/or ferrocyanide ions, typically in the form of an aqueous solution, though alkalis, acids or salts may be used. As the alkali, there may be used aqueous solutions of alkali metal hydroxides such as sodium hydroxide and potassium hydroxide and alkali metal carbonates such as sodium carbonate and potassium carbonate or an aqueous ammonia solution, etc., can be used. In the case of using the salt type resins, they are sometimes regenerated by a strong acid such as hydrochloric acid of a strong acid salt such as sodium chloride.

The regenerants are generally used at a concentration of from about 1 to about 20% by weight, preferably 3 to 10% by weight, though preferred operation in the borate ion embodiment includes a minimum 2% concentration.

As the borate ion-containing compound to be used in the preferred embodiments of the present invention, boric acid, metaboric acid, sodium borate, potassium borate, ammonium borate, sodium metaborate or like water-soluble borates can be used. Boric acid and/or such borates may be added to a ferricyanide and/or ferrocyanide ion-containing waste solution which has been used for photographic processing, or may be included in the photographic processing solution such as a bleaching solution, bleach-fixing solution of reducer. Boric acid and/or a water-soluble borate can be used in an amount ranging from about 1/10 to about $10^5$ times the sum of the moles of ferricyanide and ferrocyanide ions contained in the waste solution used for photographic processing or photographic processing solution such as the bleaching solution, bleach-fixing solution, reducer, etc. Most preferably, boric acid and/or a water soluble borate is used in an amount of from 1/5 to $10^4$ times the sum of the moles of ferricyanide and/or ferrocyanide ions. The range in terms of borate ions is about $10^{-4}$ to about $10^{-1}$ mol per 1 liter of the waste solution.

The process of the present invention can be utilized for any waste solution containing ferricyanide and/or ferrocyanide ions. Solutions containing a ferricyanide and alkali metal bromide are generally used as the bleaching solution for silver halide color photosensitive materials and silver-dye bleaching type color photosensitive materials. In some cases, such bleaching solutions contain a pH adjusting agent such as potassium hydroxide, glacial acetic acid, potassium dihydrogen phosphate, sodium acetate or sodium hydrogen sulfate and potassium alum. Sometimes, ferrocyanide and ferricyanide ions are used in bleach-fixing baths in combination with a silver halide solvent such as thiosulfate, thiocyanate etc.

In the treatment of a photographic plate used for printing, a Farmer's reducer is sometimes used in order to retouch the images after development. Farmer's reducer consists of a solution containing a ferricyanide such as potassium ferricyanide and sodium thiosulfate.

The rinsing or washing water used after treatment with such a bleaching solution, a bleach-fixing solution or a reducer etc. containing ferricyanide and/or ferrocyanide ions, or the waste solution containing ferricyanide and ferrocyanide ions brought into another bath, is passed through a layer of weakly basic anion exchange resin, by which the ferricyanide and/or ferrocyanide ions which are noxious components can be removed.

Waste solutions having any concentration of ferricyanide and ferrocyanide ions can be treated by the process of the present invention. Particularly, waste solutions in which the sum of ferricyanide ions and ferrocyanide ions is below 2000 ppm are most suitably treated, though in the borate ion embodiment efficient operation is achieved at concentrations up to 3000 ppm.

The efficiency of the treatment of the waste solutions containing below 2000 ppm of ferricyanide ions and ferrocyanide ions is inferior with the prior art method of removing such ions by forming precipitates by reaction with iron salts or the combustion method.

The ion-exchange process using weakly basic anion exchange resins of the present invention exhibits its effect especially when treating waste solutions containing below 500 ppm total of ferricyanide ions and ferrocyanide ions (1000 ppm for the borate ion embodiment), that is, a low concentration with which low economical efficiency is encountered if other methods are used. Accordingly, the process is particularly suitable for removing ferricyanide and/or ferrocyanide ions in the rinsing water after bleaching.

Any method or apparatus may be used in the present invention for contacting the waste solution containing ferricyanide and ferrocyanide ions with the weakly basic anion-exchange resin. In general, one forms a resin layer by packing the ion-exchange resin in a cylinder container and passing the waste solution downwardly through this resin layer. Of course, if desired, the waste solution may also be passed up through the layer of resin. By such methods the ferricyanide and/or ferrocyanide ions can be continuously removed. If desired, the waste solution may be treated by adding the ion-exchange resin to stored waste solution using a batch treatment and then removing the resin by precipitating the same with stirring or by filtering. However, it is generally preferred to use an ion-exchange resin layer because one advantage of this invention is that it may be practised continuously.

The aqueous alkali solution to be used for the regeneration may be brought into contact with the ion-exchange resin in any manner. The foregoing methods of contacting the waste solution used for photographic processing with the ion-exchange resin can be applied per se in the regeneration. By the regeneration, ferricyanide and/or ferrocyanide ions are removed from the ion-exchange resin, while a solution containing ferricyanide and/or ferrocyanide ions is eluted therefrom. The waste solution from the regeneration contains ferricyanide and/or ferrocyanide ions at a concentration generally as high as 10,000 – 100,000 ppm, which corresponds to about 10 to about 100 g of potassium ferricyanide per one liter of the regeneration solution. Since the waste solution from the regeneration is concentrated in ferricyanide and/or ferrocyanide ions, and contains very low amounts of inorganic anions other than hydroxy ions, ferricyanide and/or ferrocyanide ions can easily be removed therefrom by the process of pyrolysis or precipitation with iron salts, etc., if desired.

On the other hand, in a preferred embodiment the waste liquor from the anion exchange resin regeneration, which contains ferricyanide ion and/or ferrocyanide ions in high concentration (generally there will be present, other than hydroxyl ions, little or no other inorganic anions such as nitrates, bromine and borate ions, which are adsorbed only with difficulty by the resin) is diluted with water, insufficient inorganic salts such as bromide are supplied, the pH-value is adjusted with acid and the thus "regenerated" solution can be re-used as bleaching liquid. The essential components to be added to the waste regeneration solution are the ferricyanide, e.g., potassium or sodium ferricyanide, and the bromide. They can be added in an amount necessary for the bleaching solution. Since the bleaching solution composition is varied by the purposes thereof, the composition can be decided by one skilled in the art. The pH of the regeneration solution is usually adjusted to a pH of from about 5 to about 9 by adding an acid. Adjustment is usually necessary because the solution is at a higher pH due to alkali added for the regeneration of the anion-exchange resin.

It is often preferred to add an oxidizing agent such as potassium persulfate to oxidize the ferrocyanide ion to ferricyanide ion prior to use as a bleaching liquid. If desired, other additives may be added to the regeneration solution, as are known to the art, e.g., a pH-buffering agent, an anticorrosion agent, etc. One skilled in the art can easily determine the components to be added and the amounts thereof so long as the regeneration solution is analyzed.

Of course, the waste liquor after the regeneration may be concentrated to separate, e.g., potassium ferricyanide and ferrocyanide, which can then be used to prepare the bleaching liquid. In this case, inorganic anions other than ferricyanide and ferrocyanide ion are preferably not contained in the waste liquor from the regeneration.

While the above discussion has been in terms of reuse as a bleaching solution, it will be apparent that the regeneration solution can, on appropriate make-up, be reused not only as a bleaching liquid but as a bleaching-fixing liquid or a reducer, etc. Of course, such liquids would have to be ferricyanide based and while the make-up components would differ from those required for a bleach bath, the essential criterion would merely be to reproduce the original art-recognized composition, which will be within the skill of the art.

The process of the present invention has the following advantages. (1) The equipment is small and cost of the equipment is low as opposed to large and expensive apparatus as is required in the electrodialysis method and in the reverse osmosis method. (2) The ion-exchange resin can be used repeatedly because it can be regenerated. Accordingly, this process is very economical. (3) The electrodialysis method, the reverse osmosis method and the combustion and pyrolysis methods require a large source of energy such as electricity, a heavy oil etc., and the energy cost for operating these processes is high. On the contrary, the ion-exchange process of the invention requires only a small amount of chemicals as the regenerant, and the cost thereof is very low. (4) Since the processing is very simple, it does not require significant skills or large numbers of personnel. (5) Since a waste solution discharged from the resin by regenerating using the regenerant is concentrated so as to have 10 – 50g/1. of ferricyanide and/or ferrocyanide, it can be treated easily by precipitation, etc. (6) The waste liquor obtained by the regeneration contains ferricyanide ion and/or ferrocyanide ion of high concentration so that it may be re-used, e.g, as a bleaching liquid, whereby the harmful ferricyanide ion and ferrocyanide ion are not discharged at all and the waste liquor is re-used very economically.

The process of the present invention can be applied to treatments of color-negative photosensitive materials, color reversal photosensitive materials, color papers and color positives etc. using a silver halide, color treatments such as a silver-dye bleaching method and other treatments using ferricyanides. The process can be applied irrespective of the concentration of ferricyanides. Accordingly, the process can be applied to all solutions containing ferricyanide and/or ferrocyanide ions such as bleaching solutions, bleach-fixing solutions, reducing solutions and rinsing water formed therefrom. Further, the process can be applied to a ferricyanide bath which is used for other objects except for bleaching as shown in U.S. Pat. No. 3,189.452 and rinsing water used thereafter. Furthermore, the process can be used in developing apparatus such as a cinema type automatic developing apparatus, a hanger type automatic developing apparatus, a roll type automatic developing apparatus or a belt conveyor type automatic developing apparatus.

The present invention will be illustrated in greater detail by the following examples.

EXAMPLE 1

Two cylinders having a 4.5 cm inside diameter were prepared. 300 ml of a weakly basic anion exchange resin (Diaion WA:10) as is used in the present invention was packed in one of the above-mentioned cylinders and 300 ml of a strongly basic anion exchange resin (Diaion SA-10A) outside the scope of this invention was packed in the other cylinder.

A solution which was prepared by diluting a bleaching solution having the following composition with 20 liters of water was passed through the two cylinders containing ion-exchange resins at a speed of 300 ml/min., respectively.

Composition of bleaching solution:

| | |
|---|---|
| Potassium ferricyanide | 20.0g |
| Potassium bromide | 15.0g |
| Borax | 10.0g |
| Boric acid | 15.0g |
| Sodium citrate | 20.0g |
| Sodium ferrocyanide | 4.0g |
| Water to make | 1 liter |

The quantity of diluted solution passed through the cylinders when ferricyanide ion or ferrocyanie ion begun to pass through the system was measured. Detection of the ferricyanide and the ferrocyanide was carried out by spectrophotometry of the ultraviolet region.

These ion-exchange resins were then regenerated by putting them into 5% caustic soda solutions in beakers and allowing them to stand for one hour. The ion-exchange resins were then rinsed well with water and repacked in their original cylinders.

In the same manner as described above, a solution prepared by diluting the above bleaching solution with 2 liters of water was then passed therethrough, and the quantity of liquid passed therethrough when ferricyanide or ferrocyanide ions began to pass through the system was measured.

The results obtained are shown in the following table. The values obtained after regenerating 5 times by a similar procedure are also shown.

| Ion-exchange resin | Fresh | After 1st regeneration | After 5th regeneration |
|---|---|---|---|
| Weakly basic anion-exchange resin (Diaion WA-10) | 26 l. | 25 l. | 23 l. |
| Strongly basic anion-exchange resin (Diaion SA-10A) | 17 l. | 5 l. | 3 l. |

As is shown in the table, the ability of the weakly basic anion exchange resins of the invention to remove ferricyanide and ferrocyanide ions is larger than that of the strongly basic anion exchange resin when fresh, and deterioration of the ability to remove ferricyanide and ferrocyanide ions of the weakly basic anion exchange resin is very low.

EXAMPLE 2

A waste solution after bleaching and rinsing discharged from a hanger-type automatic developing apparatus was passed through an ion-exhcange resin layer. This ion-exchange resin layer was prepared by packing 2 liters of a weakly basic anion exchange resin (WA-10) in a cylinder having a 12cm inside diameter. The compositon of the bleaching solution was the same as in Example 1. The rate of flow of the waste solution through the cylinder and resin was 8 l/min.

Waste solution after bleaching and rinsing which was not passed through the ion-exchange resin layer contained 52 ppm of ferricyanide and 11 ppm of ferrocyanide. Neither ferricyanide nor ferrocyanide ions were detected from the waste solution after bleaching and rinsing which passed through the ion-exchange resin layer. When the waste solution after bleaching and rinsing was continuously passed through the ion-exchange resin layer at 8 l./min. and analyzed after 5 hours, neither ferricyanide nor ferrocyanide ions was detected in the treated waste solution.

The above examples illustrate the basic form of the present invention. The Examples below illustrate the practice of preferred embodiments of the present invention.

EXAMPLE 3

The following examples show the importance of using a buffering compound as heretofore described when the process of the present invention is practiced using the free base form of the weakly basic anion exchange resin. As heretofore stated, it is most preferred to use boric acid, metaboric acid or water soluble borates. However, needless to say, the other buffering compounds as heretofore described can be used with success, as can other buffering compounds known to the art. However, since boric acid, metaboric acid or water soluble borates offer such excellent results, the use of such compounds will be illustrated in the following examples.

Two cylinders 4.5 cm in inside diameter were prepared, one of them being packed with 300 ml of a free base type weakly basic anion-exchange resin (trade name: Dianion WA-10) and the other being packed with 300 ml of a strongly basic anion-exchange resin (trade name: Diaion SA-10A). Farmer's reducer having the following composition was diluted 20 times with water and passed through the above-described ion-exchange resin-packed cylinders at a flow rate of 300 ml/min. The amount of diluted Farmer's reduced flowed therethrough when ferricyanide or ferrocyanide ion was eluted (processing capability) was measured.

Composition of Farmer's reducer:

Solution A: Prepared by adding water to 37.5g of Red prussiate to make 500 ml. of solution.

Solution B: Prepared by adding water to 480g of crystalline sodium thiosulfate to make 2 liters of solution.

Immediately before application, 30 ml of solution A and 120 ml of solution B were mixed and water was added to make 1 liter of solution.

The Farmer's reducer thus contains 30 ml of solution A and 120 ml of solution B per one liter of aqueous solution. In other words, 500/30 (or 2000/120) liter of the Farmer's reducer contains 500 ml of solution A and 2 liter of solution B. As the waste solution, the Farmer's reducer is further diluted 20 times with water.

Ferricyanide or ferrocyanide ion was detected by adding a dilute sulfuric acid solution containing 3% ferrous sulfate and conducting spectrophotometry in the visible light region.

After ferrocyanide or ferricyanide ions were detected in the solution passed through the resin bed, the ion-exchange resin was taken out, transferred into a beaker containing 500 ml of an aqueous 4% sodium hydroxide solution and left for 30min., with occasional stirring, to regenerae the resin. The ion-exchange resins were then washed with water, and again packed in their respective cylinders. Thereafter, a solution prepared by diluting the Farmer's reducer 20 times was passed through the cylinders in the same manner as before at a flow rate of 300 ml/min. The amount passed when ferricyanide or ferrocyanide ion was eluted (processing capability) was measured.

The results obtained are tabulated in the following Table.

| No. | Ion-exchange resin | Processing capability | |
|---|---|---|---|
| | | New resin | Reproduced resin |
| 1 | Free base type weakly basic anion-exchange resin (Diaion WA-10) | 1 liter | 1 liter |
| 2 | Strongly basic anion-exchange resin (Diaion SA-10A) | 30 liter | 8 liter |

As shown in the above table, the free base type weakly basic anion-exchange resin had almost no processing capability. While the strongly basic anion-exchange resin had a small processing capability, it was greatly reduced after regeneration.

Next, two cylinders of a 4.5 cm inside diameter were prepared, one of them being packed with 300 ml of a free base type weakly basic anion exchange resin (Diaion WA-10), the other being packed with 300 ml of a strongly basic anion-exchange resin (Diaion SA-10A). A solution prepared by diluting the Farmer's reducer 20 times as before and adding 1 g/liter of boric acid was passed through each of the ion-exchange resin-packed cylinders at a flow rate of 300 ml/min., to measure the amount passed when ferricyanide ion was eluted (processing capability). Thereafter, the ion-exchange resins were regenerated in the same manner as before, and the same solution prepared by diluting the Farmer's reducer 20 times and adding 1 g/liter of boric acid was passed through the regenerated resin, and the amount passed when ferricyanide or ferrocyanide ion was eluted (processing capability) was measured. The results are given in the following table.

| No. | Ion-exchange resin | Processing capability | |
|---|---|---|---|
| | | New resin | Reproduced resin |
| 3 | Free base type weakly basic anion-exchange resin (Diaion WA-10) | 200 liter | 195 liter |
| 4 | Strongly basic anion-exchange resin (Diaion SA-10A) | 50 liter | 15 liter |

As is shown in the above table, when the free base type weakly basic anion-exchange resin was used in the presence of boric acid according to the preferred embodiment of the present invention, a large processing capability was obtained with less reduction in the processing capability after regeneration. On the other hand, when the strongly basic anion-exchange resin outside the present invention was used, the processing capability was far inferior to that in the method of the present invention even in the presence of boric acid and, in addition, the reduction in processing capability after reproduction was large.

From the results above, it can be understood that the removal of ferricyanide and/or ferrocyanide ions contained in a diluted solution of Farmer's reducer becomes possible only when a free base type weakly basic anion-exchange resin is used in the presence of boric acid.

EXAMPLE 4

Exposed and developed photographic original printing plates as described in U.S. Pat. No. 3,345,175 were well wetted with water, immersed in the Farmer's reducer having the following composition and then washed with water. As the plates were treated with Farmer's reducer, the reducer was deteriorated, and it was replaced with a new Farmer's reducer when it was deteriorated. The used Farmer's reducer and water were the waste solution.

4 liters of a weakly basic anion-exchange resin (Dianion WA-10) were packed in a resin cylinder of a 14 cm inside diameter. Waste solution of Farmer's reducer was pssed through the resin cylinder at a flow rate of 5 liter/min.

Composition of Farmer's reducer:

| First solution | Water | 200 ml |
| --- | --- | --- |
|  | Crystalline sodium thiosulfate | 20 g |
| Second solution | Water | 100 ml |
|  | Red prussiate | 10 g |

Directly before use, the Farmer's reducer was prepared by mixing 100 ml of the First solution, 5 ml of the Second solution and 100 ml of water. Though the concentration of ferricyanide and/or ferrocyanide ions contained in this Farmer's reducer waste solution varies (as described, the Farmer's reducer was replaced with a new Farmer's reducer when it deteriorated, and deterioration is determined by the experience of the process operator who is one skilled in the art so that the concentration of ions in the waste solution often varies) in the range of from about 0 to 200 ppm, the average sum of concentration of ferricyanide and ferrocyanide ions was 50 ppm. To this solution these was added 0.5 g/liter of boric acid. Thereafter, the waste solution was passed through the foregoing ion-exchange resin-packed cylinder to measure the amount passed when ferricyanide or ferrocyanide ion was eluted (processing capability). When ferricyanide or ferrocyanide ion was eluted, the resin was washed with water. Then, 1 liters of an aqueous 4% sodium hydroxide solution was passed through the cylinder at a flow rate of 500 ml/min. to conduct regeneration thereof. After washing with water, the same Farmer's reducer waste solution as was used before was passed therethrough at the heretofor recited conditions, and the amount eluted before ferricyanaide or ferrocyanide ion was eluted (processing capability), was measured. The results obtained are shown in the following table.

| Processing capability | |
| --- | --- |
| New resin | Regenerated resin |
| 9.5 tons | 9.0 tons |

As is shown in the above table, the processing capability in the method of the present invention is large. The amount of the regenerated waste solution discharged upon regeneration with an aqueous 4% sodium hydroxide solution was about 16 liter, and the sum of the concentrations of ferricyanide and ferrocyanide ions contained in the waste solution was about 30,000 ppm. From this result, it can be seen that ferricyanide and ferrocyanide ions were concentrated about 600 times.

EXAMPLE 5

300 ml of a weakly basic anion-exchange resin (Diaion WA-100) was packed in a cylinder 4.5 cm in inside diameter. Farmer's reducer having the following composition was diluted 20 times, and was passed through the above-described resin cylinder at a flow rate of 300 ml/min., and the amount eluted (processing capability) when ferricyanide or ferrocyanide ions started to pass through the system was measured.

Composition of Farmer's reducer:

Solution A: Prepared by adding water to 37.5 g of Red prussiate to make 500 ml. of solution.

Solution B: Prepared by adding water to a mixture of 480 g of crystalline sodium thiosulfate, 100 g of boric acid, and 10 g of sodium metaborate, to make 2 liters of solution.

Immediately before use, 30 ml of Solution A and 120 ml of Solution B are mixed, and water added thereto to make 1 liter of solution.

After ferricyanide or ferrocyanide ions were detected in the ion exchange resin effluent, the ion-exchange resin was regenerated in the same manner as in Example 1. Then, the above-described solution prepared by diluting the Farmer's solution 20 times was pssed through the regenerated resin. The procedures of regeneration, passing diluted solution of Farmer's reducer through the cylinder, regeneration, passing diluted solution of Farmer's reducer, etc. were repeated, and the results obtained are given in the following table.

| | Processing capability of ion-exchange resin | | | | |
| --- | --- | --- | --- | --- | --- |
| New resin | After first reproduction | After second reproduction | After third reproduction | After fourth reproduction | After fifth reproduction |
| 1901 | 1851 | 1801 | 1751 | 1751 | 1751 |

As is shown in the above table, when a weakly basic anion-exchange resin was used in the presence of borate ions according to the present invention, there was obtained a markedly improved processing capability with less reduction in the capability of the resin even after repeated regenerations.

EXAMPLE 6

Two cylinders of a 4.5 cm inner diameter were each packed with 300 ml of a free base type weakly basic anion-exchange resin (Diaion WA-11). A solution prepared by diluting the bleaching solution having the following composition 100 times with water was passed through one of the resin cylinders at a flow rate of 300 ml/min.

| Composition of the bleaching solution: | |
| --- | --- |
| Red prussiate | 100 g |
| Potassium bromide | 30 g |
| Water to make | 1 liter. |

A solution prepared by diluting the bleaching solution having the above-described composition and adding thereto 1.0 g/liter of boric acid, was passed through the other resin cylinder at a flow rate of 300 ml/min.

The amount eluted with ferricyanide ion was eluted (processing capability) was measured for each resin cylinder. When ferricyanide ion was eluted the resin cylinder was subjected to regeneration in the same manner as in Example 1, and subsequently the solution prepared by diluting the bleaching solution 100 times or the solution prepared by diluting the bleaching solution 100 times and adding 1.0 g/liter of boric acid were passed through each of the regenerated resins through which such solution had originally been passed. The results obtained are shown in the following table.

| | Additive to the diluted | Processing capability | |
|---|---|---|---|
| No. | bleaching solution | New resin | Regenerated resin |
| 1 | No additive | 0 l | 0 l |
| 2 | 10 g/liter of boric acid | 22 l | 21.5 l |

As is shown in the above table, in the diluted bleaching solution not containing the boric acid the free base type weakly basic anion-exchange resin had absolutely no capability of ion-exchanging ferricyanide ion, and such became possible only when boric acid was added thereto to ion-exchange ferricyanide ion. When boric acid is added, the processing capability of the free base type weakly basic anion-exchange resin is remarkably increased with an extremely small reduction in the processing capability of the resin after regeneration.

EXAMPLE 7

300 ml of weakly basic anion-exchange resin (Diaion WA-10) were filled in a cylinder of a 4.5cm inner diameter. A solution of bleaching liquid having the following composition diluted with water to a 20-fold volume was passed at 300 ml/min through the resin cylinder. After passing 26 liters therethrough, ferricyanide ion began to discharge from the resin cylinder.

| Composition of Bleaching Liquid: | |
|---|---|
| Potassium Ferricyanide ($K_3(Fe(CN)_6)$) | 20.0g |
| Sodium Bromide (NaBr) | 13.0 |
| Sodium Borate ($Na_2B_4O_7$) | 10.0 |
| Boric Acid ($H_3BO_3$) | 15.0 |
| Sodium Nitrate ($NaNO_3$) | 20.0 |
| Sodium Ferrocyanide ($Na_4(Fe(CN)_6)3H_2O$) | 4.0 |
| Water to make (pH: 7.70) | 1 liter |

The passing of diluted bleaching liquid was then ceased and the resin was taken out and put in a beaker. 500 ml of an aqueous 3% sodium hydroxide solution were added thereto and the mixture permitted to stand for 30 min. and then filtered. The filtrate was mixed with the washing water for the resin to yield 1 l of waste liquor for the regeneration. 20 g of boric acid, 10 ml of 6N nitric acid, 15 g of sodium bromide and 4 g of potassium persulfate were added to the waste liquor, and then the volume raised to 1.2 l with water and the pH adjusted to 7.7. An analysis of the resulting solution showed it had the same composition as the original bleaching liquid. The solution was used as a bleaching liquid, and showed a sufficient bleaching effect and other photographic performances were satisfactory.

EXAMPLE 8

The development of a color negative material as described in U.S. Pat. No. 2,322,027 was carried out using a hanger type automatic developing machine. In this case, the waste washing water after bleaching was passed through an ion-exchange resin layer which comprised a cylinder of 10 cm in inner diameter filled with 1 l of weakly basic anion-exchange resin (Diaion WA-10). The composition of the diluted bleaching liquid was the same as in Example 7. The washing water after bleaching was passed therethrough at 5 l/min. After operating the developing machine for 5 hrs, operation was ceased and regeneration was carried out with 1.3 l of an aqueous 3% sodium hydroxide solution. The anion 1.8 liters of waste liquor after the regeneration was combined with the 1.2 liters of washing water for the resin to yield 3 l of combined solution. Analysis of the solution showed 13.3g of ferricyanide ion ($Fe(CN)_6^-$), 8.8 g of ferrocyanide ion and 0.3 g of nitrate ion per liter. 2g of potassium bromide, 92g of boric acid, 95g of sodium nitrate and 26g of potassium persulfate were added to the solution, water was added to make the whole volume 4.8 l, and the pH was adjusted to 7.7. The solution was used as a bleaching liquid, and showed a sufficient bleaching effect and other photographic performances were satisfactory.

While the invention has been described in detail and with reference to specific embodiments thereof, it will be apparent to one skilled in the art that various changes and modifications can be made therein without departing from the spirit and scope thereof.

What is claimed is:

1. A process for treating a waste solution from a photographic treatment which solution contains at least one of ferricyanide and ferrocyanide ions comprising contacting the waste solution with a weakly basic anion exchange resin in the salt form thereby adsorbing said ions on said weakly basic anion exchange resin.

2. The process of claim 1 wherein said solution is contacted with said weakly basic anion exchange resin in the presence of borate ions.

3. The process of claim 2 wherein the borate ions are present in the solution treated.

4. The process of claim 3 wherein the borate ions are present in molar amount of from about 1/10 to about $10^5$ times the sum of the moles of ferricyanide and ferrocyanide ions.

5. The process of claim 1 further comprising regenerating said weakly basic anion exchange resin to remove at least one of ferricyanide and ferrocyanide ions adsorbed therein, a regeneration solution being obtained from the regeneration which comprises an aqueous solution of at least one of ferricyanide and ferrocyanide ions, and reusing the components of the regeneration solution.

6. The process of claim 5 wherein the regeneration solution contains at least one of ferricyanide and ferrocyanide ions in an amount of 10,000 to 100,000 ppm.

7. The process of claim 5 wherein the regeneration solution is reused as a photographic processing solution.

8. The process of claim 7 wherein the processing solution is a bleaching solution.

9. The process of claim 8 wherein the bleaching solution comprises ferricyanide ions and bromide ions.

10. The process of claim 1 wherein the solution comprises a used bleaching solution, bleach-fixing solution, reducing solution, or the wash solution from washing a photographic element subjected to such a solution.

11. The process of claim 1 wherein the concentration of at least one of ferricyanide and ferrocyanide is less than about 2,000 ppm.

12. The process of claim 1 further comprising regenerating said weakly basic anion exchange resin to desorb at least one of ferricyanide and ferrocyanide ions therefrom.

13. The process of claim 12 wherein regeneration is accomplished by contacting the weakly basic anion exchange resin with an alkaline material, thereby desorbing said at least one of ferricyanide and ferrocyanide ions and then contacting the weakly basic anion exchange resin with an acid material to produce the salt form of said weakly basic anion exchange resin.

14. The process of claim 1 wherein the weakly basic anion exchange resin contains exchange groups selected from the class consisting of $-NH_2$, $=NH$ or $\equiv N$.

15. The process of claim 1 wherein the weakly basic anion exchange resin contains tertiary amino exchange groups.

16. The process of claim 1 wherein the weakly basic anion exchange resin contains primary, secondary or tertiary amino groups as the exchange group, and comprises a styrene-divinylbenzene copolymer, a methacrylatedivinylbenzene copolymer or a phenol-formaldehyde condensate.

17. The process of claim 1 wherein the compound having a buffering action is present in a molar amount of from 1/10 to about $10^5$ times the sum of the moles of ferricyanide and ferrocyanide ions.

18. The process of claim 17 wherein the compound having a buffering action is a water-soluble inorganic acid, a water-soluble organic acid to a water-soluble salt thereof.

19. The process of claim 1 wherein the waste solution is contacted with a weakly basic anion exchange resin in the salt form in the presence of a buffering compound.

20. The process of claim 1 wherein the waste solution has a pH of 7 to 9 and the buffering compound is added in an amount to maintain a buffering action at a pH of 7 to 9.

* * * * *